US009965416B2

United States Patent
Galda et al.

(10) Patent No.: US 9,965,416 B2
(45) Date of Patent: May 8, 2018

(54) DMA CONTROLLER WITH ARITHMETIC UNIT

(71) Applicant: NXP USA, INC., Austin, TX (US)

(72) Inventors: Michael Galda, Roznov (CZ); Wangsheng Mei, Suzhou (CN); Martin Mienkina, Roznov (CZ)

(73) Assignee: NXP USA, INC., Austin, TX (US)

( * ) Notice: Subject to any disclaimer, the term of this patent is extended or adjusted under 35 U.S.C. 154(b) by 21 days.

(21) Appl. No.: 15/359,250

(22) Filed: Nov. 22, 2016

(65) Prior Publication Data

US 2017/0322895 A1 Nov. 9, 2017

(30) Foreign Application Priority Data

May 9, 2016 (CN) .......................... 2016 1 0300619

(51) Int. Cl.
*G06F 13/28* (2006.01)
*G06F 3/06* (2006.01)
*G06F 7/48* (2006.01)
*G06F 13/40* (2006.01)

(52) U.S. Cl.
CPC .............. *G06F 13/28* (2013.01); *G06F 3/061* (2013.01); *G06F 3/0632* (2013.01); *G06F 3/0638* (2013.01); *G06F 3/0647* (2013.01); *G06F 3/0673* (2013.01); *G06F 7/48* (2013.01); *G06F 13/4068* (2013.01)

(58) Field of Classification Search
CPC ................................. G06F 13/28; G06F 3/061
See application file for complete search history.

(56) References Cited

U.S. PATENT DOCUMENTS

| 5,835,788 | A  | * | 11/1998 | Blumer ................ G06F 9/3879 710/22 |
| 6,421,744 | B1 | * | 7/2002  | Morrison ............... G06F 13/28 710/22 |
| 6,904,473 | B1 |   | 6/2005  | Bloxhorn et al. |
| 8,205,019 | B2 | * | 6/2012  | Brink ................ G06F 11/1076 709/212 |
| 8,359,411 | B2 |   | 1/2013  | Millet et al. |
| 8,458,377 | B2 | * | 6/2013  | Piccirillo ............... G06F 13/28 710/22 |

(Continued)

FOREIGN PATENT DOCUMENTS

JP        01255923  A  * 10/1989

OTHER PUBLICATIONS

Machine translation of JP01255923A; Oct. 12, 1989.*

(Continued)

*Primary Examiner* — Glenn A Auve
(74) *Attorney, Agent, or Firm* — Charles E. Bergere

(57) ABSTRACT

A digital signal processor (DSP) includes a CPU, and a DMA controller. The DMA controller transfers data from a source to a destination as a function of an initialization command from the CPU. The DMA controller has a logic unit that performs filter operations and other arithmetic operations on-the-fly on a data stream transferred therethrough. The filter operations include multiplication by filter coefficients and addition, without processing by the CPU. The DMA controller may have subsets of hardware configurations that can perform different operations that are selectable as a function of the initialization command.

14 Claims, 5 Drawing Sheets

(56) References Cited

U.S. PATENT DOCUMENTS

| | | |
|---|---|---|
| 8,914,550 B2 | 12/2014 | Jokinen et al. |
| 2001/0018719 A1 | 8/2001 | Francis |
| 2004/0075664 A1* | 4/2004 | Law .......................... G06F 3/14 |
| | | 345/530 |
| 2009/0248910 A1 | 10/2009 | Conroy et al. |

OTHER PUBLICATIONS

Tina M. Redheendran, "Programming the DSP56300 Enhanced Filter Coprocessor (EFCOP)", Freescale Semiconductor Application Note APR39, Rev. 1, Aug. 2005, www.freescale.com.

Davide Santo, "Introduction to BestComm", Freescale Semiconductor Application Note AN2604, Rev. 1, Aug. 2005, www.freescale.com.

\* cited by examiner

DMA CONTROLLER WITH ARITHMETIC UNIT

BACKGROUND

The present invention is directed to integrated circuits and, more particularly, to a digital signal processor (DSP) with a direct memory access (DMA) controller that processes data transferred by the DMA controller.

A DSP can be used for processing signals such as audio, video, meter and sensor output signals, and for voice recognition, for example. Often the input signal is an analog signal that is converted to a digital input to the DSP by an analog-to-digital converter (ADC). The digital output of the DSP may be converted back to an analog signal using a digital-to-analog converter (DAC). A DSP may be less specialized, commonly called a microprocessor, or more specialized, commonly called a microcontroller (MCU), and may be formed as a single integrated circuit (IC) or may have more than one semiconductor chip.

A conventional DSP often comprises a central processor unit (CPU), main system memory including random access memory (RAM), and a direct memory access (DMA) controller. If the CPU itself performs read and write programmed input/output (I/O) transfer operations between a source and a destination involving the main system memory, its processing capacity is unavailable for processing tasks while it performs the I/O transfers. Typical DMA controllers perform hardware data transfers between a source memory address and a destination memory address without processing by the CPU. The CPU initiates the transfer, specifying the source and destination address of the data to be transferred, and then the CPU is free to perform other processing tasks until the DMA controller sends an interrupt to the CPU signaling that the I/O operation is complete. Conventional DMA controllers are unable to modify the data being transferred from the source to the destination address. That is, the data are just copied from source to destination.

A conventional DSP can include specialized hardware units that execute a pre-defined list of instructions selected by the CPU on input data, store the output result and notify the CPU, for example by an interrupt signal. However, such specialized hardware units add to the complexity of the DSP.

It would be advantageous to reduce the processing load of the CPU with minimal complexity of the DSP.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

DETAILED DESCRIPTION

Figure 1:
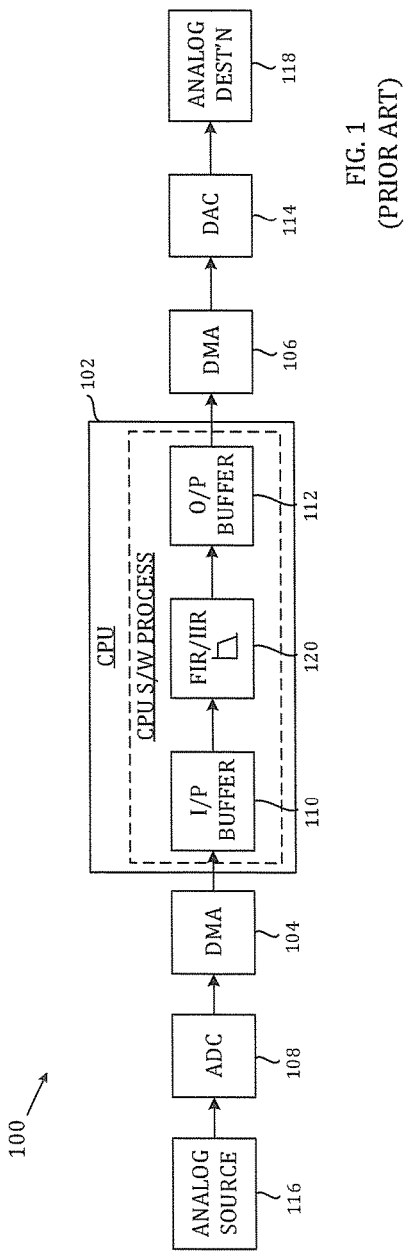
FIG. 1 is a schematic block diagram of a conventional DSP including a CPU performing filter operations, and also including a DMA controller.

FIG. 1 illustrates a conventional digital signal processor (DSP) 100 comprising a central processor unit (CPU) 102, main system memory, and conventional direct memory access (DMA) controllers 104 and 106 transferring data from source memory addresses to destination memory addresses as a function of initialization commands from the CPU. In this example, the source memory address of the DMA controller 104 is an output register of an analog-to-digital converter (ADC) 108 and its destination memory address is an input buffer 110 for the CPU 102. The source memory address of the DMA controller 106 is an output buffer 112 for the CPU 102 and its destination memory address is an input register of a digital-to-analog converter (DAC) 114. The ADC 108 receives a sampled discrete time analog input signal from an analog source 116, such as an audio or video signal source, or an analog meter or sensor, for example, and stores a corresponding digital signal in the input buffer 110. The DAC 114 receives the processed digital signal from the output buffer 112 and transfers a corresponding analog signal to a destination 118, such as an audio or video signal output, or an analog display, for example.

In the DSP 100, the CPU 102 performs a finite impulse response (FIR) or an infinite impulse response (IIR) filter operation on the digital signals by a software process including a software FIR/IIR module 120. The FIR/IIR filter operation reduces and/or enhances certain characteristics of the sampled signal. The DMAs 104 and 106 only transfer data from the source memory addresses 108, 112 to the destination memory addresses 110, 114. The FIR/IIR calculations in the software process represent a load on the CPU 102 that reduces its processing capacity for other tasks, delays or slows down the performance of the other tasks, and prevents the CPU being placed in low power mode even when its use for the other tasks is not needed.

Figure 2:
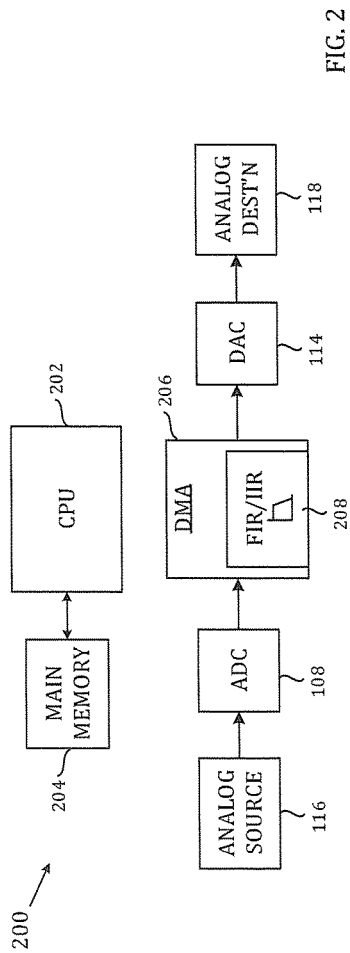
FIG. 2 is a schematic block diagram of a DSP including a DMA controller capable of transferring data and performing filter operations on the data being transferred in accordance with an embodiment of the invention.

FIG. 2 illustrates a DSP 200 in accordance with an embodiment of the invention. The DSP 200 comprises a CPU 202, main system memory 204 that may be random access memory (RAM) at least in part, and a DMA controller 206. The DMA controller 206 transfers data from a source memory address to a destination memory address as a function of an initialization command from the CPU. The DMA 206 comprises a logic unit 208 performing filter operations on-the-fly on a data stream transferred through the DMA controller from the source memory address to the destination memory address. The filter operations include multiplication by filter coefficients and addition without processing by the CPU.

The expression on-the-fly applies to operations performed on the data stream while the data stream is being transferred through the DMA controller from the source memory address to the destination memory address. In the DSP 200, the filter calculations can be performed by hardware combinational logic in the DMA controller 206, removing the filter calculations from the load on the CPU 202. The processing capacity of the CPU 202 is released for other tasks. The DMA controller may continuously process the filter calculation and the CPU can be placed in low power mode when its use for the other tasks is not needed even if the DMA controller 206 has not yet completed the filter calculations.

The logic unit 208 may include a multiplier and an accumulator, and the filter operations may include multiply-accumulate (MAC) operations. The multiplier and accumulator may perform the MAC operations on fixed-point, floating-point or fractional data. The logic unit 208 may support rounding and limiting of the data.

The logic unit 208 may also perform arithmetic operations combining a plurality of data inputs, including at least one of addition, subtraction, multiplication, and square root operations and combinations thereof on the plurality of data inputs.

Figure 3:
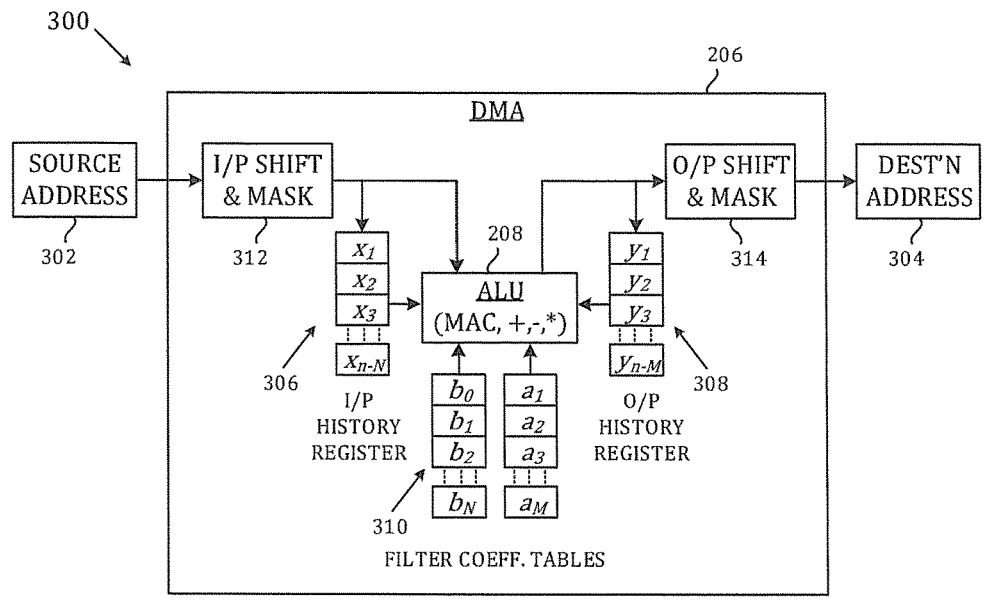
FIG. 3 is a schematic block diagram of the DMA controller of the DSP of FIG. 2.

FIG. 3 illustrates a configuration in the DSP 200, in which the DMA controller 206 transfers data from a source memory address 302 to a destination memory address 304 as a function of an initialization command from the CPU. The DMA 206 comprises an arithmetic logic unit (ALU) 208 performing filter operations on-the-fly on a data stream transferred through the DMA controller from the source memory address 302 to the destination memory address 304. The filter operations include multiplication by filter coefficients $a_1$ to $a_M$ and $b_0$ to $b_N$ and addition, without processing by the CPU 202. The DMA controller 206 may include input and output registers 306 and 308 storing historic values of the data stream $x_1$ to $x_{n-N}$ and $y_1$ to $y_{n-M}$, and look-up table (LUT) memory 310 storing the filter coefficients $a_1$ to $a_M$ and $b_0$ to $b_N$.

As a function of the initialization command, the DMA controller 206 may save input and output memory pointers to the source memory address 302 and the destination memory address 304 in main system memory 204, and may save LUT pointers to addresses in main system memory 204 that store the filter coefficients. In another implementation, the DMA controller may save LUT pointers to addresses in local memory 204 in the DMA controller that store the filter coefficients. The local memory may be small RAM buffers included directly in the DMA controller. This implementation may save additional system cycles, which are required to access the data located in the main memory through the system bus.

The DMA controller 206 may have a plurality of subsets of hardware configurations performing different operations, and the DMA controller may select at least one of the subsets as a function of the initialization command from the CPU. The DMA controller may perform the selected operations and send interrupts to the CPU when the transfer of data and the operations are complete.

The filter type and filter length of the filter operations of the logic unit 208 may be selected by the initialization command from the CPU.

The DMA controller 206 may include binary shifting and masking units 312 and 314 modifying the format of the data stream input to and output from the DMA controller.

Figure 4:
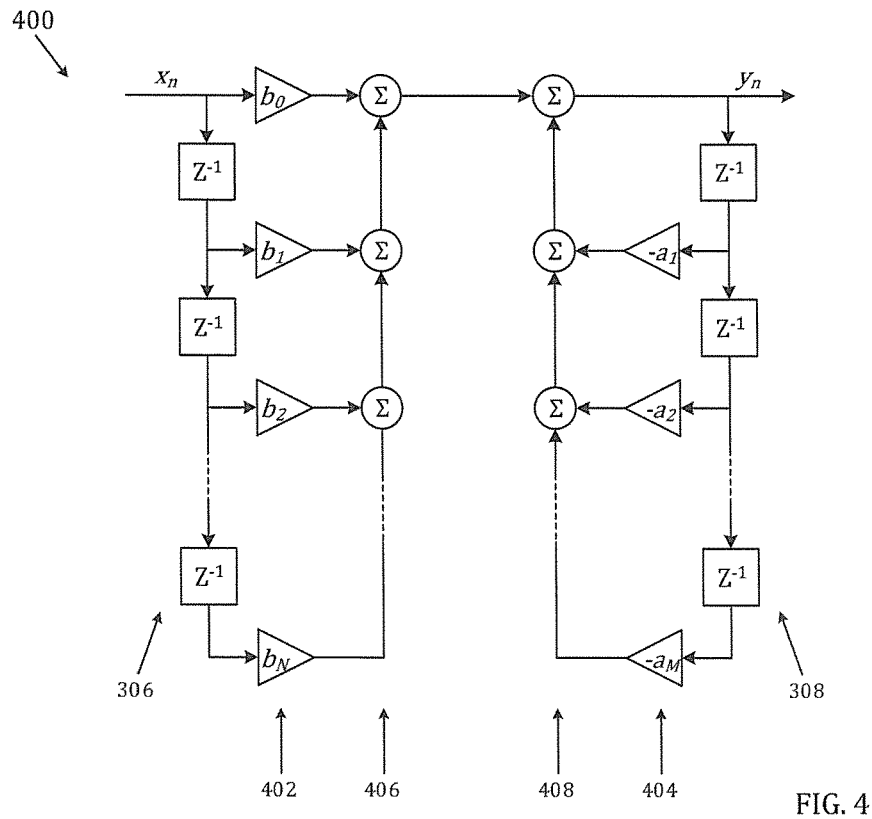
FIG. 4 is a functional diagram of operation of the DMA controller illustrated in FIG. 3.

FIG. 4 is a functional diagram illustrating the operation of an example of the DMA controller 206 and the logic unit 208 as an IIR filter. The input digital signal $x_n$ from the source address 302, after any input shift and mask functions 312, is passed through the successive input registers 306. The output signal $y_n$, that is provided to the destination address 304 after any output shift and mask functions 314, is passed through the successive output registers 308. The input and output registers 306 and 308 operate as first-in, first-out (FIFO) buffers holding instantaneous and historical input signals $x_n$ to $x_{n-N}$ and output result signals $y_n$ to $y_{n-M}$. The MAC function in the logic unit 208 has multiplication elements (illustrated here as amplifiers) 402 and 404 which are configured to multiply the historical signals by filter coefficients $a_1$ to $a_M$ and $b_0$ to $b_N$ from the LUT memory 310. Addition elements 406 and 408 then accumulate the signals after multiplication. It will be appreciated that other FIR or IIR or other filters can be implemented with different mathematical forms and structures. The DMA controller 206 illustrated is an example of a form known as Direct Form I.

Figure 5:
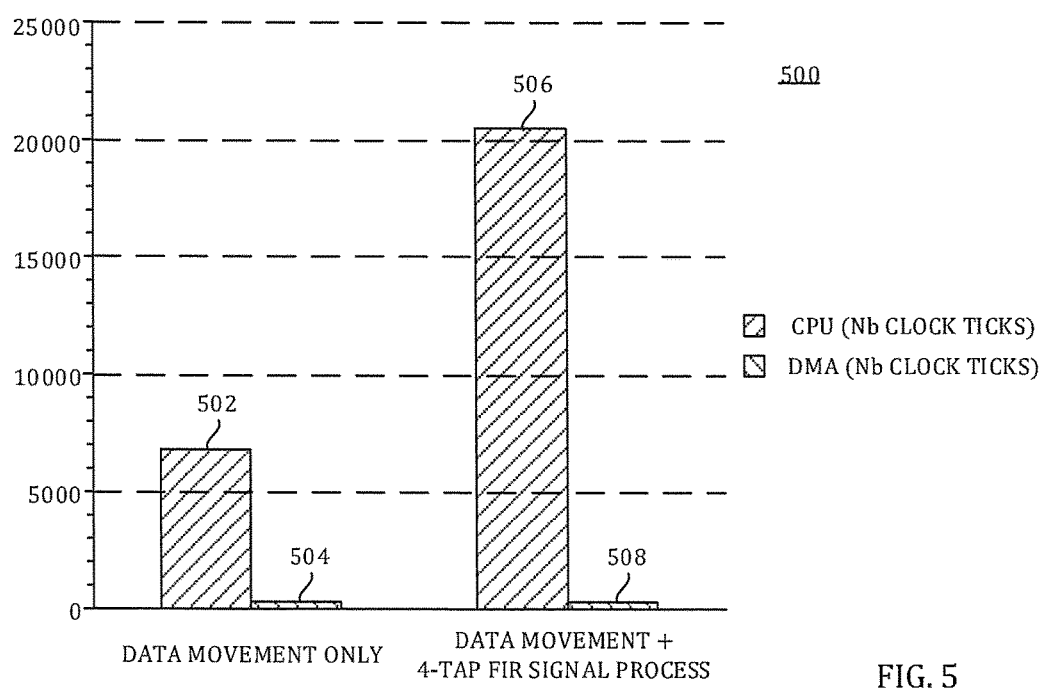
FIG. 5 shows graphs of the number of system clock cycles taken by the CPU and the DMA of the DSP of FIGS. 1 and 2 in a case of transferring data, and in a case of transferring data and also performing filter operations.

FIG. 5 shows a graph 500 that compares the number of system clock cycles taken by the CPU and the DMA of the DSPs 100 and 200 of FIGS. 1 and 2 in a case of transferring data (bars 502 and 504), and in a case of transferring data and also performing filter operations (bars 506 and 508). The cases are illustrated where a 256×16-bit data buffer is transferred from flash memory to an output buffer in RAM. The filter function is illustrated for a 4-tap FIR low pass calculation on-the-fly with 16-bit FIR coefficients at a processor core clock frequency of 72 MHz.

The bar 502 shows the activity of the CPU 102 in system clock ticks where the input data are extracted from the input buffer, transferred from input to output, and stored in the output buffer. The CPU 102 needs 6750 cycles to copy the buffers, during which time it is unable to do anything else. In the case of the DSP 200, the CPU 202 needs just 305 CPU system cycles as shown by bar 504 to re-configure the DMA 206, which then works in the background. The CPU is offloaded for other tasks.

The bar 506 shows the activity of the CPU 102 in system clock ticks where the input data are extracted from the input buffer, processed by the FIR calculation during transfer through the CPU 102 from input to output, and stored in the output buffer. The CPU 102 needs 20500 cycles to read the input data from the buffer, perform the FIR calculations, and store the result in the output buffer. A more complex calculation would take so many cycles that the CPU 102 would be unable to process the data on-the-fly together with managing the other time-critical tasks. In the case of the DSP 200, the CPU 202 needs far fewer CPU system cycles, as shown by bar 508, to re-configure the DMA 206, which then works in the background and the CPU is offloaded for other tasks. In many cases the DMA 206 may be configured only once and then can process the input data stream continuously on a batch of data, without reconfiguration needed.

Figure 6:
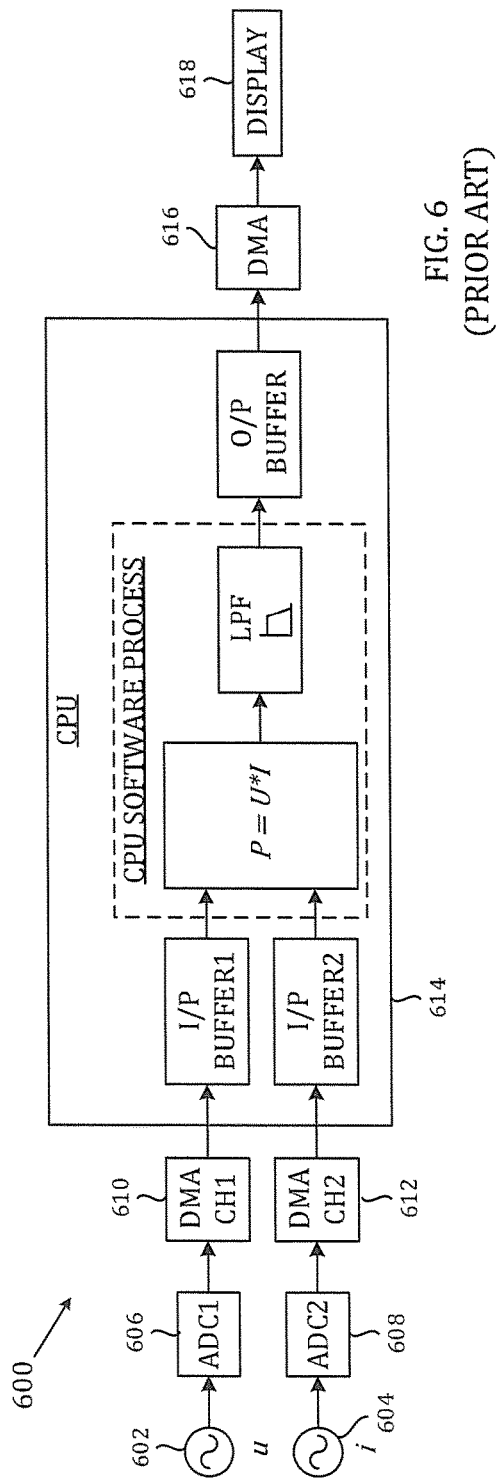
FIG. 6 is a schematic block diagram of a conventional DSP including a CPU performing arithmetic operations and also including a DMA controller.

FIG. 6 illustrates a conventional power metering DSP 600 receiving voltage and current analog input signals u and i from sensors 602 and 604. The DSP 600 has ADCs 606 and 608 in two input channels that convert the analog signals u and i to corresponding digital signals U and I. DMA controller channels 610 and 612 transfer the digital signals from the ADCs 606 and 608 to a CPU 614. The CPU 614 multiplies the voltage and current values and filters the result in a low pass filter LPF by a software process, and provides the product P=U*I through an output DMA controller to a digital display 618. Input buffers I/P BUFFER1 and I/P BUFFER2 and an output buffer O/P BUFFER store the digital input and output signals in the CPU 614. The software process of extracting the digital input and output signals from the input buffers I/P BUFFER1 and I/P BUFFER2, calculating the product P=U*I, and storing the output signals in the output buffer O/P BUFFER represents a load on the CPU 614 that reduces its processing capacity for other tasks, delays or slows down the performance of the other tasks, and prevents the CPU being placed in low power mode even when its use for the other tasks is not needed.

Figure 7:
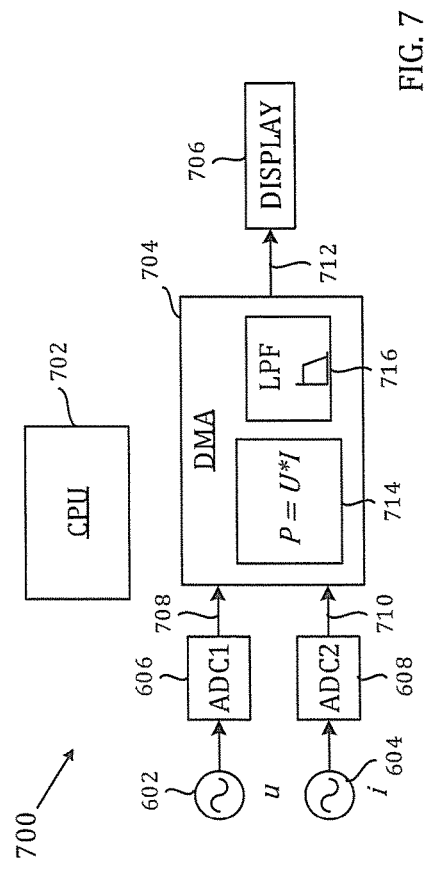
FIG. 7 is a schematic block diagram of a DSP including a DMA controller capable of transferring data and performing arithmetic operations on the data being transferred in accordance with another embodiment of the invention.

FIG. 7 illustrates a DSP 700 in accordance with another embodiment of the invention. The DSP 700 illustrated is a power metering DSP receiving voltage and current analog input signals u and i from sensors 602 and 604, but it will be appreciated that it can be adapted to other uses. The DSP 700 has ADCs 606 and 608 that convert the analog input signals u and i to digital signals U and I, and a CPU 702.

The DSP 700 also has a DMA controller 704 transferring data between the source ADCs 606 and 608 and a destination 706 as a function of an initialization command from the CPU 702. The DMA controller 704 comprises a plurality of DMA input channels 708, 710 and at least one DMA output channel 712. The DMA controller 704 also comprises an arithmetic unit 714 performing arithmetic operations on-the-fly on data transferred through the DMA controller 704. The arithmetic unit 714 has a plurality of subsets of hardware configurations performing different arithmetic operations, including at least one of addition, subtraction, multiplication, division, and square root operations and combinations thereof on data on a plurality of the DMA input channels. The DMA controller 704 selects at least one of the subsets as a function of the initialization command from the CPU 702. The DMA controller 704 performs the selected operations and sends interrupts to the CPU 702 when the transfer of data and the arithmetic operations are complete.

In the example illustrated in FIG. 7, the DMA input channels 708, 710 receive the digital signals U and I, the arithmetic unit 714 multiplies the voltage and current values by a hardware calculation, filters the result in a low pass filter 716, and provides the DC component of the product P=U*I directly to the destination, the digital display 706. The low pass filter 716 may be a first order IIR filter cutting off frequencies below 1 Hz, for example.

Figure 8:
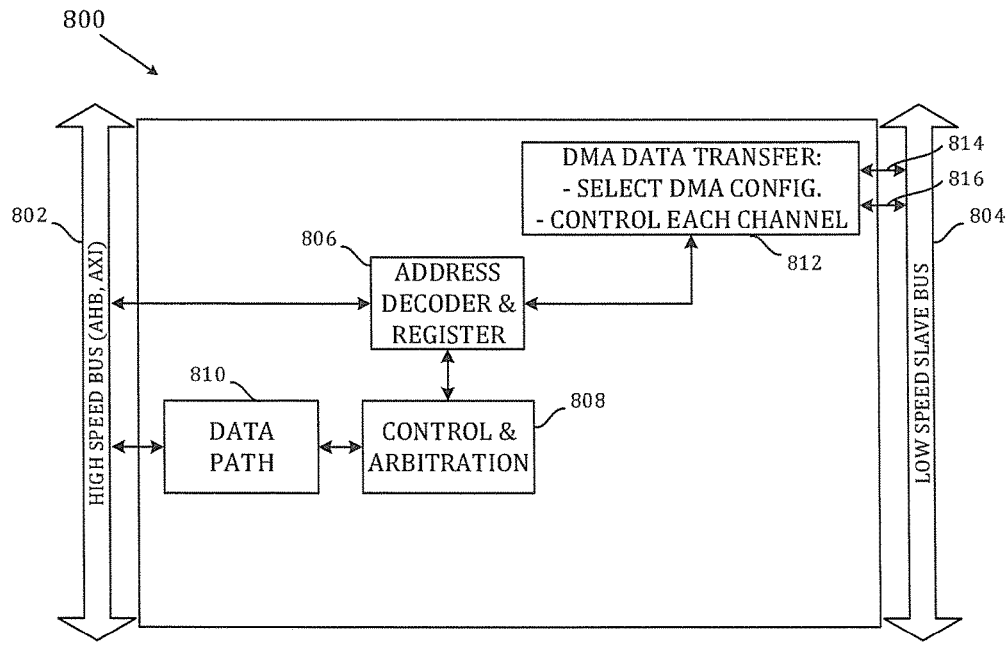
FIG. 8 is a schematic block diagram of a conventional DMA controller.

FIG. 8 illustrates structure of a conventional DMA controller 800 such as 104, 106. The DMA controller 800 transfers data from source memory addresses such as 108 to destination memory addresses such as 114 over a high speed bus 802 and a low speed slave bus 804. The DMA controller 800 exchanges initialization commands, interrupts, addresses and other messages with the CPU such as 102 over the low speed bus 804. An address decoder and register module 806 stores at least the initial source and destination memory addresses. A control and arbitration module 808 exchanges data with the bus 802 through a data path 810, and controls the transfer of data through a configuration module 812. The configuration module 812 selects pre-defined configurations (for read or write operations, for example) corresponding to the coded instructions of the initialization commands from the CPU, and controls the flow of the data in each channel 814 and 816 of the DMA controller 800 to and from the slave bus 804. The DMA 800 only transfers data from the source memory addresses 108, 112 to the destination memory addresses 110, 114 without performing logic and arithmetic operations on the data during the transfer.

Figure 9:
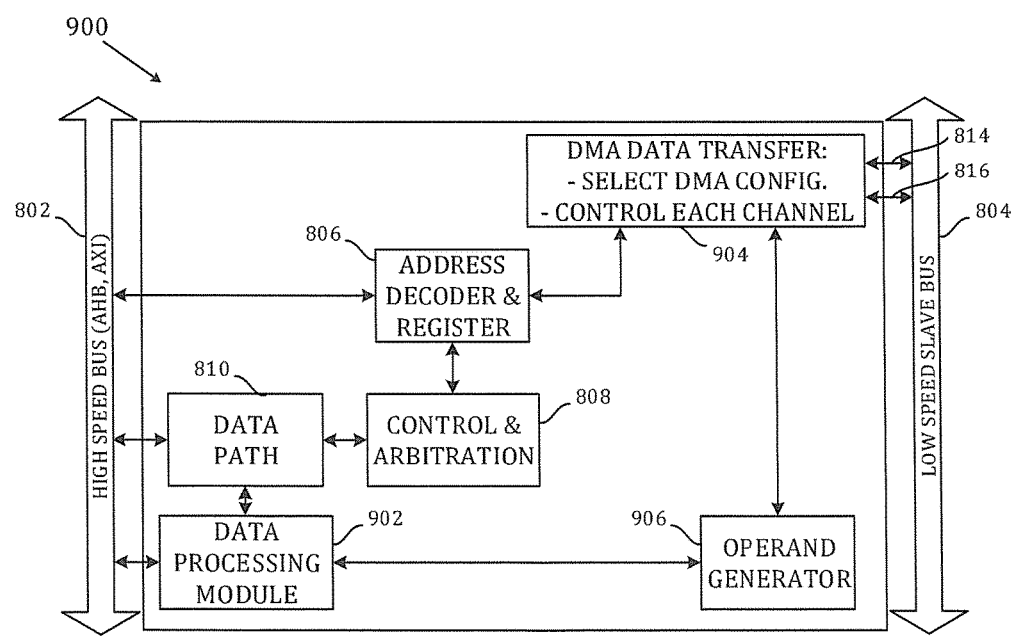
FIG. 9 is a schematic block diagram of a DMA controller that transfers data and performs logic and arithmetic operations on the data being transferred in accordance with an embodiment of the invention.

FIG. 9 illustrates structure of a DMA controller 900 in accordance with an embodiment of the invention. Like the DMA controller 800, the DMA controller 900 has an address decoder and register module 806 and a control and arbitration module 808 that exchanges data with the bus 802 through a data path 810. The DMA 900 is capable of transferring data from the source memory addresses 108, 112 to the destination memory addresses 110, 114 without processing the data, if no processing is required. The DMA 900 also has a hardware data processing module 902, such as the logic unit 208 or the arithmetic unit 714 that processes the data on-the-fly during its transfer by the DMA controller 900 from the source memory addresses to the destination memory addresses when needed. The data processing module 902 is controlled by a configuration module 904 that selects pre-defined configurations corresponding to the coded instructions of the initialization commands from the CPU, and controls the flow of the data in each channel 814 and 816 of the DMA controller 900 to and from the slave bus 804. The configuration module 904 directly selects and controls read or write operations, for example, and controls the data processing module 902 through an operand generator 906 for data processing logic and arithmetic operations, for example.

The CPU 202 and 702 may be implemented at least partially as software at least including code for performing steps of a method according to the invention when run on a programmable apparatus, such as a computer system or enabling a programmable apparatus to perform functions of a device or system according to the invention.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Similarly, any arrangement of components to achieve the same functionality is effectively "associated" such that the desired functionality is achieved. Hence, any two components combined to achieve a particular functionality can be seen as "associated with" each other such that the desired functionality is achieved, although the components should be arranged as discussed above and shown in the drawings. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A digital signal processor, comprising:
    a central processor unit (CPU); and
    a direct memory access (DMA) controller that transfers data from a source memory address to a destination memory address as a function of an initialization command from the CPU, the DMA controller comprising:
        a logic unit for performing filter operations on-the-fly on a data stream transferred by way of the DMA controller from the source memory address to the destination memory address, wherein the filter operations include multiplication by filter coefficients and addition without processing by the CPU;
        input and output registers that store historic values of the data stream; and
        a look-up table (LUT) memory that stores the filter coefficients.

2. The digital signal processor of claim 1, wherein the logic unit includes a multiplier and an accumulator, and wherein the filter operations include multiply-accumulate (MAC) operations.

3. The digital signal processor of claim 1, wherein the logic unit also performs arithmetic operations combining a plurality of data inputs, wherein the arithmetic operations include at least one of addition, subtraction, multiplication, square root operations, and combinations thereof on the plurality of data inputs.

4. The digital signal processor of claim 1, wherein as a function of the initialization command, the DMA controller saves input and output memory pointers to the source memory address and the destination memory address, and saves look-up table (LUT) pointers to addresses in a main system memory that store the filter coefficients.

5. The digital signal processor of claim 1, wherein as a function of the initialization command, the DMA controller saves input and output memory pointers to the source memory address and the destination memory address, and saves look-up table (LUT) pointers to addresses in a local memory in the DMA controller that is used to store the filter coefficients.

6. The digital signal processor of claim 1, wherein the DMA controller has a plurality of subsets of hardware configurations for performing different operations, wherein the DMA controller selects at least one of the subsets as a function of the initialization command from the CPU, and wherein the DMA controller performs selected operations and sends an interrupt to the CPU when the transfer of data and the operations are complete.

7. The digital signal processor of claim 1, wherein a filter type and filter length of the filter operations of the logic unit are specified by the initialization command from the CPU.

8. The digital signal processor of claim 1, wherein the DMA controller further comprises binary shifting and masking units for modifying a format of the data stream input to and output from the DMA controller.

9. In a digital signal processor having a central processor unit (CPU) and a direct memory access (DMA) controller for transferring data between a source and a destination as a function of an initialization command from the CPU, the DMA controller comprising:
    a plurality of DMA input channels and at least one DMA output channel;
    an arithmetic unit for performing arithmetic operations on-the-fly on data transferred through the DMA controller;
        wherein the arithmetic unit has a plurality of subsets of hardware configurations for performing different arithmetic operations, including at least one of addition, subtraction, multiplication, division, square root operations, and combinations thereof on data on a plurality of the DMA input channels;
        wherein the DMA controller selects at least one of the subsets as a function of the initialization command from the CPU;
        wherein the DMA controller performs at least one selected operation and sends an interrupt to the CPU when the transfer of data and the at least one selected operation are complete;
        wherein the arithmetic unit includes a multiplier and an accumulator, and the arithmetic operations include multiply-accumulate (MAC) filter operations, and the filter operations include multiplication by filter coefficients and addition without processing by the CPU;
    input and output registers for storing historic values of the data stream; and
    a look-up table (LUT) memory for storing the filter coefficients.

10. The DMA controller of claim 9, wherein, as a function of the initialization command, the DMA controller stores input and output memory pointers to a source memory address and a destination memory address for the data transferred, and stores look-up table (LUT) pointers to memory addresses in a main system memory that stores the filter coefficients.

11. The DMA controller of claim 9, wherein, as a function of the initialization command, the DMA controller stores input and output memory pointers to a source memory address and a destination memory address in a main system memory, and stores look-up table (LUT) pointers to addresses in a local memory in the DMA controller that stores the filter coefficients.

12. The DMA controller of claim 9, wherein a filter type and filter length of the filter operations are specified by the initialization command from the CPU.

13. The DMA controller of claim 9, further comprising binary shifting and masking units for modifying a format of the data stream input to and output from the DMA controller.

14. The DMA controller of claim 9, wherein in at least one subset of hardware configurations, the DMA controller receives first and second sampled discrete time digital input signals on respective DMA input channels, the arithmetic unit transfers to the destination an output signal that is a function of multiplication of values of the first and second input signals.

* * * * *